Patented Sept. 30, 1947

2,428,257

UNITED STATES PATENT OFFICE 2,428,257

CONVERSION OF HYDROCARBON OILS

Jacob E. Ahlberg and Charles L. Thomas, Riverside, Ill., assignors to Universal Oil Products Company, Chicago, Ill., a corporation of Delaware No Drawing. Application October 7, 1944, Serial No. 557,719

3 Claims. (Cl. 196—52)

This application is a continuation-in-part of Serial Number 373,308, filed January 6, 1941, now Patent Number 2,369,001, which was a continuation-in-part of our earlier applications Serial Number 132,092, filed March 20, 1937, now Patent Number 2,282,922, and Serial Number 176,648, filed November 26, 1937, now Patent Number 2,229,353.

This invention relates to the conversion of hydrocarbons such as petroleum fractions and hydrocarbonaceous oils generally including synthetic oils from various carbon containing sources. More specifically, the invention is concerned with a modification of hydrocarbon oil conversion processes in the presence of catalytic materials which promote the formation of very high antiknock gasoline. The catalysts peculiar to this invention are prepared according to definite procedures so that they are highly selective when in prolonged use but are less disposed to accumulate carbonaceous deposits than catalysts heretofore used for this purpose.

The art of pyrolytically cracking gasoline to produce relatively high antiknock gasoline is well established and it is now generally known that gasolines of still higher antiknock value may be obtained when cracking under non-pyrolytic conditions in the presence of various types of catalysts. It has long been known that cracking catalysts of the aluminum chloride type give high antiknock gasoline but cannot be employed without serious difficulties due to the deposition of carbonaceous material on the catalyst and the regeneration of the aluminum chloride catalyst. It is also known that when employing catalysts of the reduced metal types such as iron or nickel for example that hydrocarbon reactions are accelerated which lead largely to the formation of gas rather than to the formation of predominant yields of high antiknock gasoline. With this type of catalyst a very high rate of carbon deposition is experienced. The catalysts of the present invention are synthetic and depend upon mixing hydrated silica and certain hydrated metal oxides for their high activity. These catalysts may in general be employed under conditions where carbon formation on the catalyst can be handled in a practical manner. It is the main object of the present invention to provide a process wherein the latter type of catalysts are employed in a modified form whereby carbon and gas forming reactions are substantially reduced. The catalysts are of a refractory character which enables them to retain their catalytic properties over extended periods of time under high temperature conditions of use and regeneration, and they are also characterized by definite methods of manufacture and exact reproducibility.

In one specific embodiment the present invention consists of a process for the conversion of hydrocarbon oil which comprises subjecting the oil under conversion conditions to contact with a catalyst composite comprising precipitated hydrated silica, precipitated hydrated alumina, and precipitated hydrated zirconia substantially free of alkali metal compounds and a relatively inactive non-adsorptive natural occurring silica substantially free of alkali and alkaline earth metal compounds and of metal oxide impurities.

According to the present invention hydrocarbon fractions such as high boiling petroleum distillates are cracked at a temperature within the approximate range of 700 to 1150° F. under a pressure of substantially atmospheric to approximately 1000 pounds per square inch while in contact with modified synthetic catalysts such as modified composites of hydrated alumina deposited upon hydrated silica. Although this is a preferred active catalyst material, similar silica-zirconia or silica-alumina-zirconia composites may be used. Also composites of hydrated silica with hydrated magnesia, hydrated thoria, hydrated vanadia, and other hydrated metal oxides may be used since they have hydrocarbon-splitting properties but are not equivalent among themselves or to the silica-alumina and silica-zirconia composites in their catalytic effectiveness. The catalysts are preferably prepared as mixtures of the hydrated oxide gels and are mixed with a relatively inactive heat resistant material such as kaolin substantially free from iron oxide and other metal oxide impurities. Although the relatively inactive material may be mixed with the gel materials during their preparation it has been found that the gel material is preferably added immediately before drying to produce a powdered catalyst, immediately before forming the mass into particles such as in the extrusion procedure or the dried gel powder may be mixed with the relatively inactive material and pilled.

What constitutes highly active cracking catalysts and what constitutes relatively inactive material is a matter which is very confusing when referring to the prior art. One finds, for example, that pumice and silica are employed as catalysts and that diatomaceous earth or kieselguhr, which is frequently employed as a support or spacing agent in a number of catalysts to catalyze various types of chemical reactions, is thought of as a catalyst. These materials in our experience have practically no catalytic activity in cracking reactions as compared to the highly active synthetic catalytic materials subsequently described. Some small degree of cracking may occur in the presence of such siliceous materials but the cracked motor fuel product resulting from the treatment resembles much more closely the product from thermal cracking which is lower in anti-knock value and has a different hydrocarbon character than the catalytically cracked product obtained when the catalysts of the present invention are employed. Among the above silica materials is diatomaceous earth which as ordinarily obtained has only a restricted use in the present invention since if large amounts are added, the final catalyst particles obtained therefrom do not have suitable density and are less desirable in the hydrocarbon conversion reactions.

Similarly, as the above inactive materials, various other well-known silica materials have practically no catalytic activity. These may be identified by their mineralogical, optical or X-ray nature and include hydrated natural silicas such as opal, chalcedony and tripoli, and anhydrous silicas such as vitreous or amorphous silica, the $\alpha$ and $\beta$-quartzes, the $\alpha$, $\beta_1$ and $\beta_2$-tridymites and the $\alpha$ and $\beta$-crystobalites. In contrast to these silica materials are hydrated silica gel, silica hydrogel or precipitated hydrated silica which are not used as are the above relatively inactive materials. These latter hydrated silicas have a certain degree of catalytic activity which however does not approach the high activities of the composited active catalytic material employed in the present invention and the octane numbers of the motor fuel resulting from contact with these silica gel materials are much lower.

Similarly as for the inactive silicas, many hydrated and anhydrous forms of inactive alumina are known such as bayerite, $\alpha$-alumina trihydrate and gibbsite, $\gamma$-alumina trihydrate; diaspore, $\alpha$-alumina monohydrate and boehmite which is $\gamma$-alumina monohydrate; corundum $\alpha$-alumina and $\beta$-alumina. If these materials are mixed with the relatively inactive silica materials above described, there is no improvement in the catalytic properties. Some bauxites, i. e., alumina dihydrates and particularly $\gamma$-alumina which is known as activated alumina, have varying degrees of activity but do not produce the high yields and antiknock properties characteristic of the active catalytic materials of the present invention. The active aluminas also have a tendency to catalyze the formation of abnormally large carbonaceous deposits which is a factor avoided by the present invention.

Many clays such as kaolin and china clay which contain combined silica and alumina in some naturally occurring condition have been described by some as cracking catalysts and in some cases we have found that they give mild catalytic effects. These materials are considered, however, as being relatively inactive as compared with the precipitated hydrated silica-hydrated alumina, for example, employed in this invention since the commercial grade of kaolin employed in the specific examples subsequently described has an activity corresponding to approximately $\frac{1}{10}$ of that of the active catalytic material of this invention on a weight basis. These clays should not be confused with special clays of the montmorillonite type, particularly those which have been acid-treated since these are of a higher degree of activity. A commercial grade of the latter type of clay showed an activity corresponding to approximately 40% of the active catalyst material of this invention on a weight basis. Clays of the latter type although having fair activity appear to be relatively unsuitable for mixing with the active catalyst materials of this invention since mixtures thereof have not been found to be highly stable when in prolonged use at high temperatures. This is in distinct contrast to the mildly active clays above described.

The diluent materials employed in the present invention should be non-adsorptive or relatively non-adsorptive in order that they function in the desired manner. It is believed that the carbon forming tendency of a catalyst is in some degree dependent upon its adsorptive qualities. The "carbon," so-called, which is a product of cracking is not in a true sense carbon but is hydrocarbonaceous and contains more or less high boiling hydrocarbons which are adsorbed on the catalyst. The catalyst of the present invention reduces the formation of some of this combustible material by incorporating therein a relatively non-adsorptive diluent.

The relatively inactive materials above illustrated may thus be practically non-porous, non-absorptive, non-adsorptive and have no catalytic activity or they may be somewhat porous and have a very mild catalytic activity. These materials are not limited to relatively inactive silica and/or alumina since other materials such as zircon or zirconium silicate, or magnesia may be used. It is necessary that the material be stable at high temperatures so that it does not sinter or flux and thereby reduce the structure and activity of the modified catalyst. The material should therefore withstand prolonged treatment at a temperature of approximately 1600–1700° F. without any change. Any material which will reduce at a temperature up to approximately 1100° F. or will be oxidized at approximately 1300–1500° F. cannot be employed. Materials which poison the catalyst or catalyze side reactions, or deactivate the catalyst are also unsuitable. Thus, metals of group VIII of the periodic table or their oxides should be absent or present only in unavoidably small quantities otherwise they may become catalytically active for the formation of carbon. Also, strongly basic materials must be absent since they apparently flux and deactivate the catalyst at high temperature.

Referring now to the highly active catalytic materials, the mixture of hydrated silica and hydrated metal oxide may be prepared by a number of alternative methods which have certain necessary features in common as will be subsequently described. Generally speaking, the catalytic material resulting therefrom may be considered to comprise an intimate admixture of silica and the metal oxide with the added relatively inactive material in which all the individual components indicate activity ranging from substantially no activity to a low activity as compared to the high activity displayed by the aggregate. The activity is not an additive function and is relatively constant for a wide range of proportions of the active oxide components as well as of the relatively inactive component. It cannot be stated with respect to the active oxide components which one is to be considered the promoter for the remaining gel component according to conventional terminology nor can it be definitely stated for example how the silicon, aluminum, oxygen and relatively small amounts of hydrogen are chemically associated in the final catalyst composition.

The highly active material contained in the catalyst masses is the silica-metal oxide cracking catalyst in which the hydrated silica forms the primary or predominating material with which the remaining metal oxide components are intimately associated. The active catalyst material is prepared in the hydrated gel condition by a number of alternative methods and some of the methods which may be employed in mixing the hydrated silica and hydrated metal oxide components are as follows:

1. A precipitated hydrated silica gel may be suspended in a solution of a salt of the metal for which a hydrated metal oxide is to be precipitated in the presence of the suspended hydrated silica by the addition of volatile basic precipitants such as ammonium hydroxide for example or ammonium carbonate, ammonium hydrosulfide, ammonium sulfide or other volatile basic precipitants.

2. The precipitated hydrated silica gel may be mixed while in a wet condition with a hydrated metal oxide prepared for example by the addition of a volatile basic precipitant to a solution of a salt of the corresponding metal.

3. The hydrated silica gel may be added to a solution of a metal salt and the hydrated oxide of the corresponding metal precipitated by hydrolysis, preferably by heating, or the hydrated silica gel may be mixed with a suitable amount of the metal salt and heated whereby the metal oxide will be deposited as a result of the decomposition of the metal salt.

The character and efficiency of the ultimately prepared silica metal oxide catalytic material will vary more or less with the exact conditions of precipitation and/or mixing, the ratio of the components and added relatively inactive material and also with the purification treatment. The materials and the methods of preparation employed, and resulting catalytic material are not necessarily equivalent since the proper materials and methods may be so improperly used that the cost is greatly increased and in some cases even unsuitable catalysts for prolonged use may be obtained.

One method of mixing alkali metal silicates and acid to form silica gel is to acidify an aqueous solution of sodium silicate by the addition of an acid such as hydrochloric acid. The dilution of the alkali metal silicate and the manner in which it is mixed with the acid influences the gelatinous nature of the hydrated silica gel which is formed. When gradually adding the acid to a diluted alkali metal silicate, precipitation occurs for the major part in an alkaline solution and the precipitate is generally of a gelatinous nature. The acid is added until the aqueous menstruum is highly acid whereupon the precipitation of hydrated silica is practically complete. The excess acid may then be neutralized by the addition of ammonium hydroxide and in a preferred embodiment the hydrated silica is then purified according to the subsequently described treatments.

An important feature resides in the fact that catalysts of greatly increased stability and efficiency in hydrocarbon cracking reactions are produced when there is substantially complete exclusion of alkali metal ions or impurities from the hydrated silica-hydrated metal oxide composites. At some stage in the preparation, the catalytic material is freed from alkali metal impurities so that the catalyst composite will not be subject to fluxing or sintering tendencies which may occur in the prolonged use thereof at high temperature if these impurities are not removed. In one desirable procedure alkali metal ions are removed from the hydrated silica prior to mixing with the remaining hydrated metal oxides. The purification treatment may, however, be employed at subsequent stages in the preparation and before or after mixing with the relatively inactive material but generally to less advantage. One method consists of washing the hydrated silica or the composited hydrated silica-hydrated metal oxide mixture with acidic solutions to extract alkali metal impurities incorporated therein as in the formation of hydrated silica from alkali metal silicates. Another method consists in treating with ammonium compounds or salts, such as ammonium chloride in solution or other halides, the sulfate, the nitrate or the acetate so that alkali metal ions will not be substantially present after the washing treatment. According to another procedure, salts of multivalent metals such as the salt of the metal oxide component may be used in removing the sodium or other alkali metal impurities from the catalytic preparation.

As has been indicated above various methods may be employed in mixing the hydrated silica component with the remaining hydrated metal oxide component of the catalysts. One desirable procedure consists in suspending the hydrated silica in a solution of a salt or salts of a metal or metals for which the corresponding hydrated oxides are to be precipitated in the presence of the hydrated silica. Thus salts of aluminum, zirconium, vanadium, magnesium, thorium and other desirable metal salts may be used, and the hydroxides or hydrated oxides thereof precipitated by the addition of a basic agent, preferably a volatile basic precipitant such as ammonium hydroxide. According to this method a purified silica gel may be suspended in a solution of aluminum and zirconium chlorides for example, and hydrated alumina and hydrated zirconia precipitated by the addition of ammonium hydroxide. In this case, the hydrated alumina and hydrated zirconia are coprecipitated but good results however may be obtained by depositing one of these components prior to the remaining component, or either one of the components may be used and the other component omitted from the preparation. The ratio of the components contributing to the catalytically active portion of the catalyst preparation may be varied within relatively wide limits, the limiting factor being more in evidence with respect to small proportions than with larger proportions of the various components. In general it appears that an approximation of the minimum proportions of the hydrated metal oxides to be employed relative to the hydrated silica is of the order of 2 to 6 mol per cent. Smaller proportions may, however, be used and catalytic effects obtained. Relatively large percentages of the remaining hydrated oxide components with respect to the hydrated silica component may be employed such as 50% by weight and higher in some cases. Generally speaking, the proportion of the hydrated oxides mixed with the hydrated silica component are less than this amount in the preferred catalysts. The character and efficiency of the ultimately prepared catalyst will vary more or less with precipitation and/or mixing conditions, the purification treatment, the ratio of the components, the amount and nature of the relatively inactive material mixed with the catalytically active material, calcining conditions, etc. Several specific examples will be shown below to illustrate some of the preferred embodiments.

Whatsoever the hydrated oxides used in the gel composite and their manner of preparation, they are mixed with the relatively inactive material above described prior to drying or forming into particles as has been indicated above. The dry powdered materials may be mixed with a lubricant and formed into shaped particles by briquetting or in pilling machines. In subsequent calcination at high temperature of the order of 1000 to 1500° F., the lubricant is removed by volatilization, decomposition and/or oxidation. As representative of the relatively inactive materials which are added is a nearly white kaolin which is practically free from impurities such as alkali or alkaline earth metal and iron compounds. In a preferred particle-forming procedure the relatively inactive material is added to the undried gel composite which is then extruded. In fact one of the advantages of the present invention resides in the fact that with the addition of the finely powdered materials described to the gel composite it is possible to extrude the mixture and obtain extruded particles of suitable strength and density after drying and calcining. These particles have better burning qualities during regeneration treatment than those of the gel when extruded alone.

A desirable procedure of mixing the relatively inactive material with the catalytically active gel material consists in thoroughly mixing the gel with the powdered relatively inactive material as in a ball mill or an intensive mixer. The suitability of the mixture for shaping into particles in the extrusion procedure and the strength of the particles resulting therefrom varies with the proportions of the gel and inactive powder material employed in the mixture. Good results have been obtained from the standpoint of forming the particles and obtaining particles of good strength, stability and activity when employing approximately 50% of powdered relatively inactive material and 50% of gelatinous catalytic material on the dry weight basis. The proportions however may be varied over a relatively wide range depending upon the specific catalyst and the operation in which it is to be employed. The moisture content and fineness of the powder can be regulated to mutually adjust various proportions of the materials for the proper extrusion thereof. As a result of adding the relatively inactive material to the highly active material there is reduced carbon formation upon the final catalyst particles when in use in catalytic cracking reactions. The decrease in the total carbon formation is proportionately greater than the decrease in the gasoline yield. The operation can therefore be readjusted to obtain more gasoline with the modified catalyst of the present invention before it is necessary to interrupt the cracking reaction and periodically regenerate the catalyst. Since the regeneration period of the part of the catalyst being regenerated is nonproductive of gasoline, the decreased carbon formation upon the catalyst decreases the regeneration requirements. The increase in the mass of the contact material resulting from the addition thereto of the relatively inactive material further serves to reduce the time of the regeneration treatment since the modified catalyst may, as a result of its increased heat capacity, be more rapidly regenerated without locally overheating the catalyst while also employing higher oxygen concentrations in the regenerating gases.

The catalysts of our invention may be conveniently utilized in carrying out various types of hydrocarbon conversion reactions when employed as filling material in tubes or disposed in trays or in chambers. The average size of the particles may vary within the approximate range of 4 to 10 mesh more or less which is not restricted to any particular shape or method of particle formation. A hydrocarbon oil fraction is usually heated to substantially reaction temperature and the vapors thereof are contacted with the catalyst particles. The hydrocarbon vapors may be passed downward through the catalyst and where large beds of catalyst are involved, the passage of vapors may be restricted to definite paths rather than allowing the vapors to have unrestricted contact with the large beds of catalytic material. Where this method is employed, the temperature of the contact materials while in use or during regeneration may be controlled by various operating procedures or by heat interchange devices. After the oil vapors have passed over the catalyst as in catalytic cracking, the products may be separated into fractions unsuitable for further cracking and/or insufficiently converted fractions which may be subjected to further cracking treatment, and the gasoline and gaseous products. The higher boiling fractions may be removed from the system, may be reprocessed together with the charging stock, or may be processed in separate passes so as to ultimately obtain maximum utilization of the charging stock in producing gasoline products.

The catalysts may also be employed as a shaped or formed catalyst where the catalyst beds are moved in and out of contact with the oil processed, the catalyst being regenerated when out of contact with the oil. The catalysts may further be employed as a powder which is mixed with the oil and the oil and catalyst mixture processed under cracking conditions.

Various types of hydrocarbon conversion reactions take place in the presence of the catalyst depending partly upon the temperature, pressure and time conditions and partly upon the boiling point range and type of hydrocarbons in the hydrocarbon oil processed. These reactions may include carbon-to-carbon cleavage, isomerization, cyclization, hydrogen transfer, dehydrogenation, hydrogenation and desulfurization reactions. In the case of higher boiling hydrocarbons for example there is a cleavage of long chained carbon-to-carbon bonds. Isomerization reactions may occur whereby the lower boiling hydrocarbons formed tend to become more branch chained. Hydro-aromatic hydrocarbons present in the oil undergoing decomposition or formed therein by cyclization of olefins may undergo dehydrogenation to form aromatic hydrocarbons, and hydrogen from these reactions may combine with other olefins present during reaction to form more paraffinic hydrocarbons. The latter reactions tend to occur at the lower temperature given in the range of operating conditions whereas more unsaturated hydrocarbons, particularly olefins are produced at the higher temperatures employed. The hydrocarbons produced are generally of a more branched chain structure than are those produced in thermal cracking treatment. The temperatures utilized may be a temperature from about 700 to about 1150° F. and the pressure employed may be from about atmospheric to about 500 or 1000 pounds per square inch. The space velocities employed may vary from approximately ¼ to 60, the space velocity being defined as the hourly volume of liquid hydrocarbon charged per volume of reactor space occupied by the catalyst.

The following specific examples are given to illustrate applications of the process of the invention, the method of catalyst preparation and its general character being also described. The invention should not be considered as limited to these examples of the process or to the particular catalyst preparations designated since these are given merely as illustrations of the novelty and utility of the invention.

EXAMPLE I

An active catalytic material was prepared according to the above described procedures having a molar composition of $100SiO_2:2Al_2O_3:4ZrO_2$. 64% by weight of this material was mixed with 36% by weight of an inactive silica which in this case was added to washed silica hydrogel precipitated by the addition of hydrochloric acid to a water glass solution. After purifying the mixture by washing with acidulated water the mixture was disposed in a solution of aluminum and zirconium chloride and hydrated alumina and hydrated zirconia precipitated in the presence of the hydrated silica plus inactive silica mixture. The composited material was then washed, filtered and dried and the dried material formed into particles of 6 to 10 mesh. These particles were calcined at a temperature of approximately 932° F.

A Pennsylvania gas oil was vaporized and the vapors thereof were contacted with the 6–10 mesh particles of the above described preparation at a temperature of 932° F. under atmospheric pressure for a period of 6 hours using a liquid space velocity of 4. A similar run was made using the silica-alumina-zirconia catalyst without added inactive silica. The results obtained in these runs were as follows:

| Catalyst | Silica-alumina-zirconia without added inactive silica | Silica-alumina-zirconia with added inactive silica |
|---|---|---|
| Gasoline yield, vol. per cent of charge | 27.2 | 26.1 |
| Octane Number | 80 | 80 |
| Gas, Wgt. per cent of charge | 8.9 | 7.5 |
| Carbon Deposit, Wgt. per cent of charge | 0.47 | 0.29 |

In this run there was a 4% decrease in gasoline yield when the inactive silica was admixed with the catalytic material and the carbon deposit was decreased to the extent of 38%.

When using zircon, zirconium silicate or zirconium spinel instead of the inactive silica, similar results were obtained.

EXAMPLE II

Catalytic material of the molar composition $100SiO_2:5Al_2O_3$ was prepared according to the above procedure as follows: Hydrated silica was precipitated by the addition of hydrochloric acid to a dilute solution of a commercial water glass and the precipitated silica was purified by washing with acidulated water until the hydrated silica was practically free from sodium impurities. The purified hydrated silica was then suspended in a solution of aluminum chloride and hydrated alumina precipitated in the presence of the suspended hydrated silica by the addition of ammonium hydroxide. The silica-alumina composite was then washed and filtered and a portion thereof dried. Part of the dried material was pelleted with the aid of a lubricant to form ⅛" x ⅛" pellets, and part of the dried material was mixed with an equal weight of a commercial grade of powdered kaolin and also pilled with the aid of a lubricant. The pelleted catalysts were calcined at a temperature of approximately 1500° F. Portions of the undried gel were mixed with the commercial kaolin to produce mixtures which contained 50, 70 and 90% of kaolin mixed with 50, 30 and 10% of the silica-alumina gel on the dry basis. These mixtures were then extruded and carefully dried and the dried extrusions were calcined at a temperature of approximately 1500° F. These five catalyst preparations were used in the catalytic cracking of a Mid-Continent gas oil having a 32.3 A. P. I. gravity and an initial boiling point of 464° F. in an Engler distillation, 50% distilling over the 631° F. and 90% at 757° F. The cracking runs covered a period of approximately 30 days in which a cycle operation was used with one hour of contact with the hydrocarbon vapors alternating with one hour of regeneration. The temperature of contact was approximately 965° F. and the pressure was substantially atmospheric. A space velocity of four was employed and the regeneration with air was carried out at a temperature of approximately 1300–1350° F. The results of these runs are given in the following tabulation:

| | | | | | |
|---|---|---|---|---|---|
| Active Catalytic Material, per cent | 10 | 30 | 50 | 50 | 100 |
| Relatively Inactive Material, per cent | 90 | 70 | 50 | 50 | 0 |
| Shaping of particles by | Extrusion | | | Pelleting | |
| Gasoline yield, vol. per cent of charge: | | | | | |
| (a) | 15.5 | 21.2 | 24.9 | 27.0 | 28.4 |
| (b) | 14.7 | 20.4 | 24.8 | 23.9 | 28.4 |
| Octane Number: | | | | | |
| (a) | 77.0 | 79.5 | 80.5 | 81.0 | 80.0 |
| (b) | 77.0 | 79.0 | 79.5 | 80.5 | 79.0 |
| Gas Yield, Vol. per cent of charge: | | | | | |
| (a) | 2.9 | 3.7 | 5.2 | 5.7 | 6.0 |
| (b) | 3.6 | 4.0 | 5.1 | 5.8 | 7.2 |
| Carbon Deposit, wt. per cent of Charge: | | | | | |
| (a) | 0.31 | 0.40 | 0.62 | 0.70 | 0.94 |
| (b) | 0.36 | 0.43 | 0.50 | 0.63 | 0.92 |
| Carbon Deposit, wt. per cent of gasoline and gas yield: | | | | | |
| (a) | 1.90 | 1.81 | 2.32 | 2.41 | 3.07 |
| (b) | 2.15 | 1.98 | 1.95 | 2.39 | 2.90 |

(a) Initial results.
(b) Results after approximately 30 days of use.

EXAMPLE III

In the preparation of a catalyst composite of the type indicated above, 450 volumes of 2.5 normal hydrochloric acid was added slowly to 3400 volumes of a solution containing 415 parts by weight of sodium silicate found by analysis to contain 29% silica and 8.9% sodium oxide. The mass of precipitated silica hydrogel was filtered, washed once and then added to a slurry consisting of 120 parts by weight of diatomaceous earth in 2500 volumes of water. The mixture was stirred and filtered and the filter cake was stirred into a slurry in 2500 volumes of water and then filtered, this operation being performed twice. The filter cake was next stirred into a slurry in 2500 volumes of water to which 50 volumes of 0.1 normal hydrochloric acid was added and the mixture was filtered. After this operation was performed twice the filter cake was washed six times with 2500 volumes of water until the wash water was chloride-free and filtered. The filter cake was stirred into a slurry in 3000 volumes of water, mixed with an aqueous solution consisting of 40 parts by weight of aluminum chloride hexahydrate dissolved in 500 volumes of water after which was added thereto 550 volumes of aqueous ammonia solution containing 9 parts by weight of ammonia. The liquid was separated from the precipitate and admixed diatomaceous earth by filtration and the filter cake was dried at 300° F.

and then ground into a fine powder, pressed into cake form, broken into 6–10 mesh particles, and calcined at 932° F.

Passage of Pennsylvania gas oil over the above described mass containing diatomaceous earth, alumina, and silica at 932° F. during 6 hours using a liquid space velocity of 4 gave the results shown in Table 1, which includes comparative data on other runs made similarly in the presence of a silica-alumina composite prepared in the same manner except without diatomaceous earth and in the presence of another catalytic mass prepared by precipitating alumina hydrogel in the same proportions on the same sample of diatomaceous earth previously purified by washing with acid and water.

TABLE 1

*Cracking of Pennsylvania gas oil at 932° F. during 6-hour periods with 4 liquid space velocity*

| Catalyst | $SiO_2:Al_2O_3$ on Diatomaceous Earth | $SiO_2:Al_2O_3$ |
|---|---|---|
| Density of catalyst | 0.55 | 0.46 |
| Products: | | |
| Gasoline, Vol. per cent of Charge | 28.0 | 29.5 |
| Gas, Wt. per cent of charge | 7.2 | 9.7 |
| Molecular weight | 41.5 | 43.5 |
| Olefins, Wt. per cent | 5.1 | 5.6 |
| Octane number of gasoline | 80.0 | 80.3 |

The above catalysts, after use, were reactivated by heating at 932° F. in a stream of air in order to burn off carbonaceous materials deposited during the cracking runs. It was observed that the silica-alumina-diatomaceous earth catalyst required only about two-thirds as much air for reactivation as did the silica-alumina catalyst. This observation is evidence that less carbonaceous deposits accumulated on the diluted catalyst during cracking.

A further advantage of the silica-alumina-diatomaceous earth composite as a cracking catalyst is its decreased cost over that of silica-alumina alone. Thus as shown in Table 1 approximately the same yield of 80 octane number gasoline and less carbon formed in the presence of a diluted catalyst as compared with silica-alumina catalyst.

The above results show in general that the catalyst of this invention is active and stable. The data show that with a 50–50 mixture, i. e., one part of each, the relatively inactive and the active catalytic material, there is no appreciable reduction in octane number initially or after extended use. Where possibly too much material is added as in the 10–90 mixture of the present example, i. e., 1 part of active for 9 parts of relative inactive material there is some depreciation in octane number. The results also show that for a minor decrease in gasoline yield there has been a proportionately larger decrease in carbon formation.

We claim as our invention:

1. A process for the conversion of hydrocarbon oil which comprises subjecting the oil under conversion conditions to contact with a catalyst composite comprising precipitated hydrated silica, precipitated hydrated alumina and precipitated hydrated zirconia substantially free of alkali metal compounds and tripoli substantially free of alkali and alkaline earth metal compounds and of metal oxide impurities.

2. A process for the conversion of hydrocarbon oil which comprises subjecting the oil under conversion conditions to contact with a catalyst composite comprising precipitated hydrated silica and precipitated hydrated zirconia substantially free of alkali metal compounds and tripoli substantially free of alkali and alkaline earth metal compounds and of metal oxide impurities.

3. A process for the conversion of hydrocarbon oil which comprises subjecting the oil under conversion conditions to contact with a catalyst composite comprising precipitated hydrated silica and precipitated hydrated alumina substantially free of alkali metal compounds and tripoli substantially free of alkali and alkaline earth metal compounds and of metal oxide impurities.

JACOB E. AHLBERG.
CHARLES L. THOMAS.

REFERENCES CITED

The following references are of record in the file of this patent:

UNITED STATES PATENTS

| Number | Name | Date |
|---|---|---|
| 1,840,450 | Jaeger et al. | Jan. 12, 1932 |
| 2,331,338 | Michael et al. | Oct. 12, 1943 |
| 2,349,575 | Voorhees I | May 23, 1944 |
| 2,351,793 | Voorhees II | June 20, 1944 |
| 2,124,583 | Morrell | July 26, 1938 |

FOREIGN PATENTS

| Number | Country | Date |
|---|---|---|
| 423,001 | Great Britain | Jan. 23, 1935 |